US008036612B2

(12) United States Patent
Kum

(10) Patent No.: US 8,036,612 B2
(45) Date of Patent: Oct. 11, 2011

(54) METHOD, APPARATUS AND SYSTEM FOR TERRESTRIAL DMB SERVICE

(75) Inventor: Dong-Jun Kum, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 839 days.

(21) Appl. No.: 11/834,360

(22) Filed: Aug. 6, 2007

(65) Prior Publication Data

US 2008/0039037 A1 Feb. 14, 2008

(30) Foreign Application Priority Data

Aug. 8, 2006 (KR) ........................ 10-2006-0074935

(51) Int. Cl.
*H04B 1/18* (2006.01)
*H04K 3/00* (2006.01)

(52) U.S. Cl. ................ 455/166.2; 455/184.1; 455/186.1

(58) Field of Classification Search .... 455/161.1–161.2, 455/166.1–166.2, 184.1, 185.1, 186.1; 348/731–732; 725/38
See application file for complete search history.

(56) References Cited

U.S. PATENT DOCUMENTS

| | | | | |
|---|---|---|---|---|
| 6,282,412 | B1 | 8/2001 | Lyons | |
| 6,801,779 | B1 | 10/2004 | Liebenow | |
| 2003/0040272 | A1 | 2/2003 | Lelievre et al. | |
| 2004/0198217 | A1 | 10/2004 | Lee et al. | |
| 2006/0111109 | A1 * | 5/2006 | Kim | 455/436 |
| 2006/0166675 | A1 | 7/2006 | Yoon | |
| 2007/0039026 | A1 * | 2/2007 | Yoon et al. | 725/62 |

FOREIGN PATENT DOCUMENTS

| | | |
|---|---|---|
| CN | 1812273 | 8/2006 |
| EP | 1 526 745 | 4/2005 |
| EP | 1 641 264 | 3/2006 |
| EP | 1 659 711 | 5/2006 |
| GB | 2 373 655 | 9/2002 |
| JP | 2004-015076 | 1/2004 |
| JP | 2005-086367 | 3/2005 |
| KR | 1020010001797 | 1/2001 |
| KR | 1020050039004 | 4/2005 |
| KR | 1020050049253 | 5/2005 |
| KR | 1020060056011 | 5/2006 |
| KR | 1020070016404 | 2/2007 |

* cited by examiner

*Primary Examiner* — Lee Nguyen
(74) *Attorney, Agent, or Firm* — The Farrell Law Firm, P.C.

(57) ABSTRACT

A method, apparatus and system for Digital Multimedia Broadcasting (DMB) service are provided. A DMB receiving terminal identifies a channel service area in which the DMB receiving terminal is currently located based on an identified current location, and configures a channel information list by searching only a frequency band corresponding to the channel service area. When the channel service area is changed, the DMB receiving terminal searches a pre-stored connection channel list, and identifies a predetermined channel established as a transition channel corresponding to a channel which the DMB receiving terminal has received, from channels belonging to the changed channel service area. The DMB receiving terminal then receives the identified channel and provides terrestrial DMB service, thereby reducing a channel search time period and smoothly providing the terrestrial DMB service.

22 Claims, 4 Drawing Sheets

METHOD, APPARATUS AND SYSTEM FOR TERRESTRIAL DMB SERVICE

PRIORITY

This application claims priority under 35 U.S.C. §119(a) to a Korean Patent Application filed in the Korean Intellectual Property Office on Aug. 8, 2006 and assigned Serial No. 2006-74935, the entire contents of which are incorporated herein by reference.

BACKGROUND OF THE INVENTION

1. Field of the Invention

The present invention relates to Digital Multimedia Broadcasting (DMB) service, and in particular, to a method and apparatus for smoothly providing terrestrial DMB service according to channel service areas by a DMB receiving terminal.

2. Description of the Related Art

Generally, broadcasting signals provided by a provider of digital broadcasting (e.g., terrestrial DMB such as Eureka-147 DMB) are transmitted within a frequency range allocated according to each broadcasting station. For example, in Korean DMB, six terrestrial broadcasting providers have been selected, in which each broadcasting station is allocated a frequency band of 2 MHz. In order to receive broadcasting signals transmitted through such six frequency bands, it is necessary to tune a receiver to the frequency band of a provider desired by the user. Thus, a receiver with only one tuner cannot receive signals transmitted through frequency bands other than a set frequency band and cannot check the reception sensitivity of a corresponding broadcasting channel.

Also, since remote nodes of each broadcasting station are allocated different frequency bands, a frequency band allocated to a terrestrial DMB for the Korean capital area, for example, is now unavailable for the same terrestrial DMB in a local area, and different frequency bands depending on areas must be used for the same broadcast program. As a result, like FM radio, whenever the user moves from one area to another area, it is necessary to search for a corresponding frequency band and to tune the receiver to the searched frequency band. Such a tuning operation is manually performed.

In FIG. 1, it can be understood that although the Korean terrestrial DMB uses frequency bands of CH7 to CH13, which are in a VHF band, the Korea National Capital Region area broadcasting currently being provided uses two frequency bands of CH8 and CH12, and different areas except for the National Capital Region area use frequency bands which can be secured according to each area. Here, FIG. 1 is a view illustrating the present status of terrestrial DMB channels selected according to service areas. Owing to such a frequency environment being different depending on each area, it is impossible to construct a Single Frequency Network (SFN) for nationwide service. Instead, a Multi-Frequency Network (MFN) using frequencies allocated according to areas is constructed.

However, since an Electric Program Guide (EPG) for the terrestrial DMB being currently provided is not provided, the user must make a channel information list about channels which can be received in a corresponding area, through a channel search by himself/herself. Such a channel information list includes a detailed frequency band, an ensemble ID and a service ID. The detailed frequency band may include three detailed areas of A, B and C, for example, 12A, 12B and 12C, according to each band. The ensemble ID represents a broadcasting station name, and the service ID represents a channel name. When searching for a channel under the MFN condition, the user cannot recognize the frequency band corresponding to each service area, so that the user must perform a channel search with respect to all the terrestrial DMB bands of CH7 to CH13. This results in searching even for unnecessary frequency bands, thereby requiring a long period of time for channel searching. When a channel search is performed with respect to all the terrestrial DMB bands, it takes about 40 seconds to one minute.

In addition, when a channel service area is changed while a DMB broadcast is being provided through the DMB service, a channel providing the DMB broadcast is changed according to the change of the channel service area, so that even the same DMB broadcast is interrupted.

SUMMARY OF THE INVENTION

An aspect of the present invention is to substantially solve at least the above problems and/or disadvantages and to provide at least the advantages below. Accordingly, one aspect of the present invention is to provide a terrestrial DMB service method and apparatus which can reduce a channel search time period for terrestrial DMB.

Another aspect of the present invention is to provide a terrestrial DMB service method and apparatus which enable the user to easily search for a terrestrial DMB channel.

A further aspect of the present invention is to provide a terrestrial DMB service method and apparatus which can continuously provide a terrestrial DMB broadcast even when a reception location is changed.

According to one aspect of the present invention, there is provided a terrestrial Digital Multimedia Broadcasting (DMB) service method of a DMB receiving terminal. The method includes sensing that a channel search request occurs; identifying a current location; searching a channel service area database, which includes channel service area information according to areas, for a channel service area corresponding to the current location; and searching for a frequency band corresponding to the channel service area, configuring a channel information list with channels belonging to the channel service area, and providing the channel information list to a user.

According another aspect of the present invention, there is provided terrestrial Digital Multimedia Broadcasting (DMB) service apparatus which includes a memory unit for storing a channel service area database which includes channel service area information according to areas; and a DMB processing unit for, when occurrence of a channel search request is sensed, identifying a current location, searching a pre-stored channel service area database for a channel service area corresponding to the current location, searching for a frequency band corresponding to the channel service area, configuring a channel information list with channels belonging to the channel service area, and providing the channel information list to a user.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
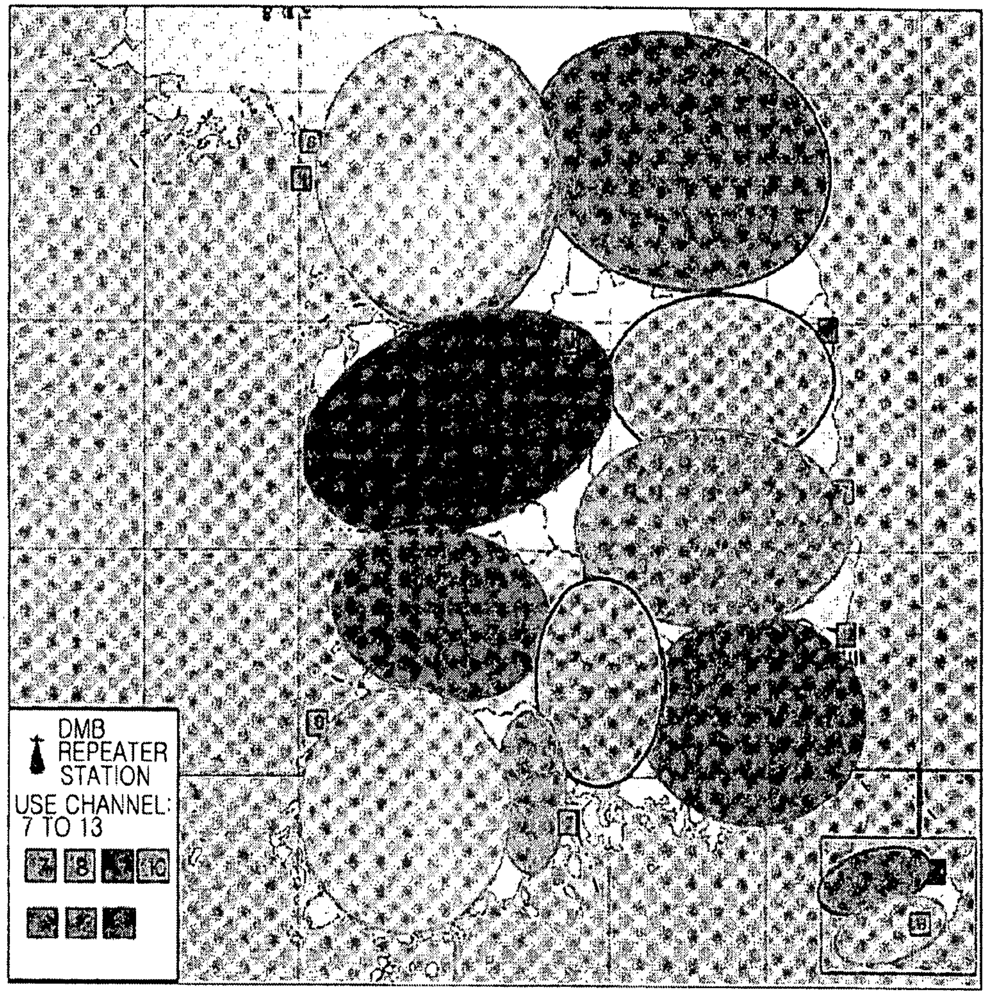
FIG. 1 is a map illustrating the present status of terrestrial Digital Multimedia Broadcasting (DMB) channels selected according to service areas.

Hereinafter, one preferred embodiment according to the present invention will be described with reference to the accompanying drawings. It is to be noted that the same elements are indicated with the same reference numerals throughout the drawings. In the following description of the embodiment of the present invention, a detailed description of known functions and configurations incorporated herein will be omitted when it may obscure the subject matter of the present invention.

Figure 2:
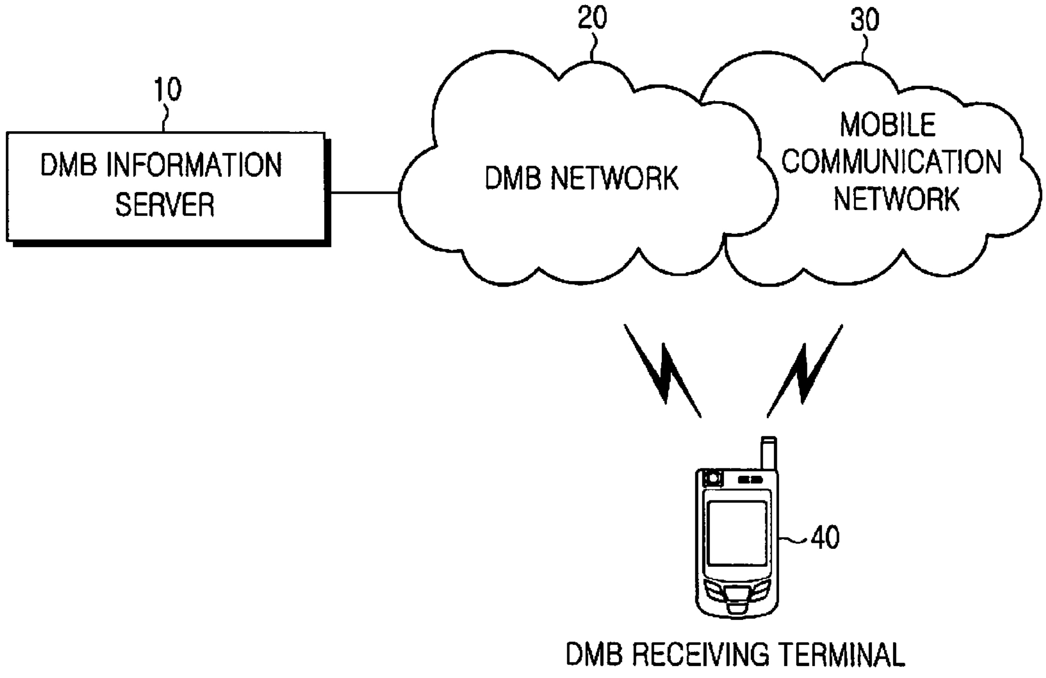
FIG. 2 is a schematic diagram illustrating the construction of a communication system according to the present invention.

FIG. 2 is a schematic diagram illustrating the construction of a communication system to which the present invention is applied. The communication system includes a Digital Multimedia Broadcasting (DMB) information server 10, a DMB receiving terminal 40, a DMB network 20 and a mobile communication network 30.

The DMB network 20, which provides terrestrial DMB service, broadcasts programs provided by a DMB contents management server to the DMB receiving terminal 40, and cooperates with the mobile communication network 30. The mobile communication network 30 performs a mobile communication function with the DMB receiving terminal 40.

According to an embodiment of the present invention, the DMB information server 10 stores and manages a channel service area database, and provides the DMB receiving terminal 40 with a part of the channel service area database which corresponds to the request of the DMB receiving terminal 40. The channel service area database is constructed such that the whole area to which terrestrial DMB service is provided is partitioned into a predetermined lattice, wherein the longitude and latitude values of each lattice cell are matched with a corresponding terrestrial DMB service area, and each channel service area is mapped to a corresponding frequency band. Such a channel service area database may be easily constructed by using Global Positioning System (GPS) and DMB receivers mounted on a vehicle. Here, the channel service area database may be stored in a server (e.g., the DMB information server 10) managed by a broadcasting provider, a mobile communication provider or a manufacturer, or may be stored in the DMB receiving terminal 40. In operation, when the channel service areas are changed, the channel service area database must be newly updated. For this reason, if the channel service area database is stored in the DMB receiving terminal 40, the DMB information server 10 may provide an updated channel service area database to the DMB receiving terminal 40 in real time whenever the channel service areas are changed.

The DMB receiving terminal 40 receives and provides terrestrial DMB to the user. The DMB receiving terminal 40 identifies a current location of the DMB receiving terminal 40, identifies a channel service area corresponding to the current location, constructs a channel information list which includes receivable channels based on the identified channel service area, and provides the channel information list to the user. Also, when the service area is changed while the DMB receiving terminal 40 is receiving a channel, the DMB receiving terminal 40 receives a transition channel established in the current channel service area corresponding to the previous channel received in the previous service area, and provides the user with the transition channel. The DMB receiving terminal 40 may have a mobile communication function, may have a GPS receiver, or may have both the mobile communication function and the GPS receiver.

Figure 3:
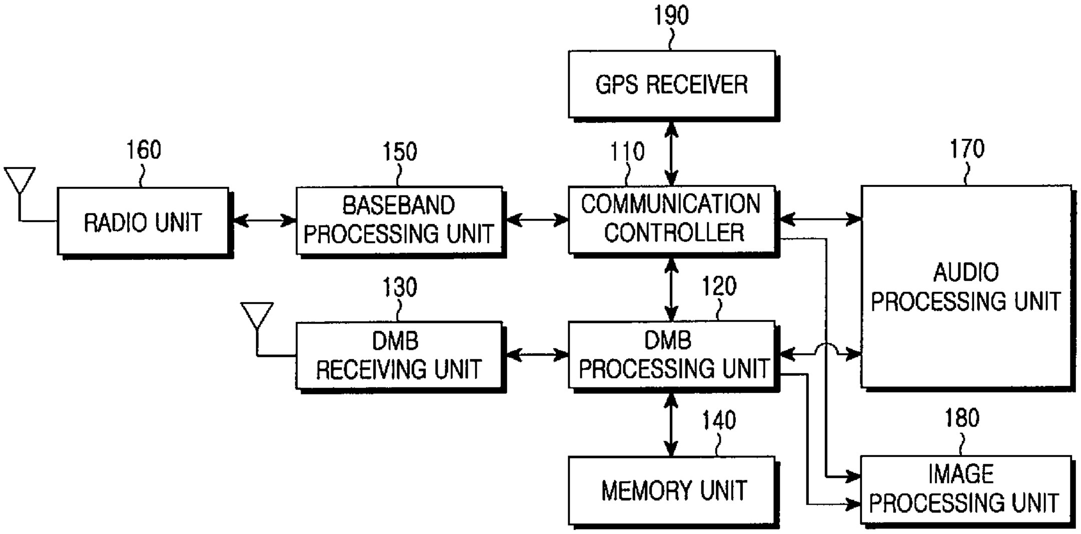
FIG. 3 is a schematic diagram illustrating the construction of the DMB receiving terminal according to the present invention.

FIG. 3 is a schematic diagram illustrating the construction of the DMB receiving terminal 40 having both the mobile communication function and the Global Positioning System (GPS) receiver.

In FIG. 3 the DMB receiving terminal 40 includes a communication controller 110, a DMB processing unit 120, a DMB receiving unit 130, a memory unit 140, a baseband processing unit 150, a radio unit 160, an audio processing unit 170, an image processing unit 180 and a GPS receiver 190.

The DMB receiving unit 130 receives and transmits a DMB signal to the DMB processing unit 120 under the control of the DMB processing unit 120. The DMB processing unit 120 decodes the DMB signal, which is input from the DMB receiving unit 130, according to key data input from the controller 110. The DMB processing unit 120 outputs image data included in the decoded DMB signal to the image processing unit 180, and outputs DMB sound data therein to the audio processing unit 170.

The communication controller 110 controls the operation of the DMB receiving terminal 40 according to mobile communication performance thereof. The radio unit 160 transmits/receives radio signals to/from a mobile communication base station through an antenna. For example, the radio unit 160 modulates a signal to be transmitted, which has been input from the communication controller 110 through the baseband processing unit 150, to a radio signal, and transmits the radio signal through the antenna. Also, the radio unit 160 demodulates a radio signal received through the antenna, and provides the demodulated signal to the communication controller 110 through the baseband processing unit 150.

The baseband processing unit 150 processes a baseband signal transmitted/received between the radio unit 160 and the communication controller 110.

The audio processing unit 170 is connected to a plurality of sound output means and microphones, so as to output sound data input from the microphones to the communication controller 110, and so as to output sound data input from the communication controller 110 and DMB processing unit 120 to the sound output means. The sound output means is the last means for outputting a sound, and includes a speaker, a receiver, etc.

The image processing unit 180 displays various images including image data input from the communication controller 110 and DMB processing unit 120 under the control of the communication controller 110 and DMB processing unit 120.

The GPS receiver 190 receives GPS data from a GPS satellite. The memory unit 140 stores programs for the process and control operations of the DMB processing unit 120, reference data, various updatable data for storage, etc., and provides a working memory for the DMB processing unit 120.

In addition, the memory unit 140 stores the channel information list and a connection channel list. The connection channel list includes a transition relation established between channels belonging to different service areas. In operation, each channel belonging to one service area is established to have a transition relation with a channel belonging to each of the other service areas according to the designation of the user, and such a transition relation is recorded in the connection channel list. For example, channel a in an A channel service area may be established to have a transition relation with channel a' in a B channel service area, and with channel a" in a C channel service area. Channels a, a' and a" may be different channels depending on channel service areas although providing the same broadcasting service, may be channels to provide broadcasting services by the same service provider although the contents of the broadcasting services are different, or may be channels having no connection with each other. When the DMB receiving terminal 40 moves from an service area to another service area, the DMB receiving terminal 40 searches the transition relation recorded in the connection channel list. The DMB receiving terminal 40 then detects a predetermined channel established as a transition relation corresponding to a channel received in the previous service area, from among channels belonging to the current service area. Next, the DMB receiving terminal 40 receives DMB service through the detected channel, and provides the received DMB service to the user.

Figure 4:
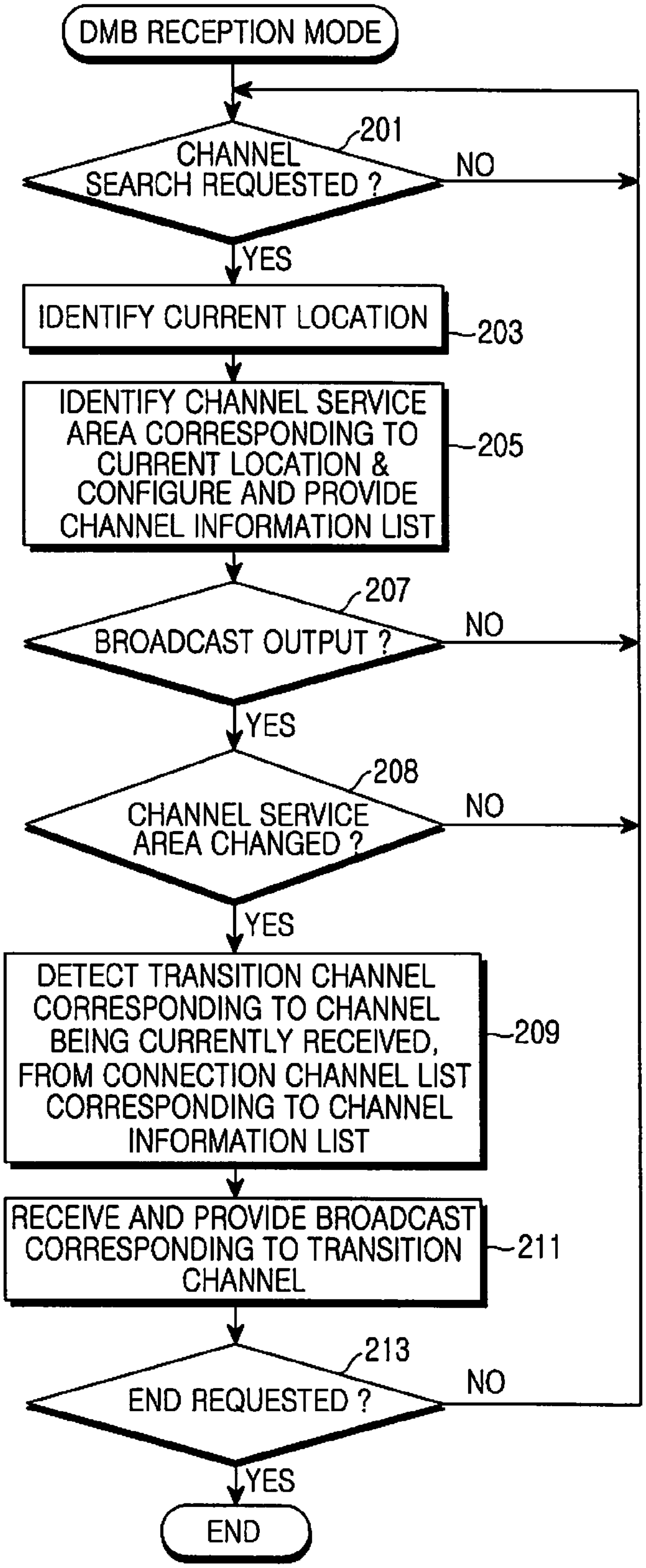
FIG. 4 is a flowchart diagram illustrating the operation process of the DMB receiving terminal according to the present invention.

In FIG. 4 a flowchart illustrates the operation process of the DMB receiving terminal 40. In a DMB reception mode, the DMB processing unit 120 of the DMB receiving terminal 40 determines if it has received a channel search request in step 201. Here, the channel search request may occur in response to a channel search request input of the user, or may occur at preset intervals. In addition, it is possible to set a channel search request to occur when the DMB receiving terminal 40 has received a new base station ID from a base station of the mobile communication network 30, which is sensed by the communication controller 110. The base station ID represents an ID allocated to each base station belonging to the mobile communication network 30 in order to identify each base station. When a new base station ID has been received through the radio unit 160, this may mean that the DMB receiving terminal 40 moves and enters the service area of a new base station.

When it is determined in step 201 that a channel search request has occurred as noted above, the DMB processing unit 120 identifies the current location of the DMB receiving terminal 40 in cooperation with the communication controller 110 in step 203. The current location of the DMB receiving terminal 40 may be acquired in two manners. First, when the DMB receiving terminal 40 includes the GPS receiver 190, the DMB receiving terminal 40 can acquire the current location through the GPS receiver 190. Second, when the DMB receiving terminal 40 has a mobile communication function, the DMB receiving terminal 40 can acquire the current location by using the ID of the base station which the DMB receiving terminal 40 currently accesses. The location identification using the base station ID cannot be achieved by the DMB receiving terminal 40 itself. Therefore, the location identification using the base station ID is achieved through an external Location Based Service (LBS) server. Location information acquired through the GPS receiver 190 is accurate within 10 m, and location information acquired by using a base station ID is accurate within several kilometers. The location of the DMB receiving terminal 40 is expressed and used as longitude and latitude.

After acquiring the current location, the DMB processing unit 120 searches the channel service area database stored in the memory unit 140, identifies the channel service area corresponding to the current location, and identifies a frequency band to be searched according to the identified channel service area in step 205. Then, the DMB processing unit 120 searches the frequency band and configures and provides a channel information list to the user. That is, not all frequency bands to provide terrestrial DMB service, but only a frequency band to be receivable at an area where the DMB receiving terminal 40 is currently located is searched to configure the channel information list. Therefore, it is possible to significantly reduce a period of time required for frequency band search, as compared with conventional methods. If the memory unit 140 does not store the channel service area database, the DMB processing unit 120 accesses the DMB information server 10 in cooperation with the communication controller 110. Then, the DMB receiving terminal 40 identifies the channel service area corresponding to the current location from the channel service area database stored in the DMB information server 10 by using the current location information. Next, the DMB receiving terminal 40 extracts a frequency band to be searched from the channel service area database stored in the DMB information server 10. Thereafter, the DMB receiving terminal 40 searches the extracted frequency band and configures a channel information list. Access of the DMB receiving terminal 40 to the DMB information server 10 may be achieved through the mobile communication network 30, wireless Internet, etc. The channel information list includes information about channels which are currently being broadcasted in the corresponding channel service area, and contains a detailed frequency band, an ensemble ID and a service ID. The user may request a channel change with reference to the channel service area.

Thereafter, the DMB processing unit 120 determines if the broadcast of a channel is currently being output to the user in step 207. If it is determined that the broadcast of a channel is currently being output to the user, the DMB processing unit 120 goes to step 208; but if it is not, the DMB processing unit 120 returns back to step 201 so as to repeat steps 201 through 205. In step 208, the DMB processing unit 120 determines if the channel service area has been changed. If it is determined that the channel service area has been changed, the DMB processing unit 120 goes to step 209, but if it is not, the DMB processing unit 120 returns back to step 201 so as to repeat steps 201 through 205. In step 209, the DMB processing unit 120 detects a transition channel belonging to the changed channel service area which corresponds to the channel being currently received from the connection channel list, and then proceeds to step 211. In step 211, the DMB processing unit 120 receives and provides a broadcast of the transition channel to the user. Therefore, when a channel service area is changed, a channel transition is automatically performed to provide terrestrial DMB service, so that it is possible to continuously provide the terrestrial DMB service. Thereafter, in step 213, if the user requests to end DMB, the DMB processing unit 120 ends the operation thereof, but if the user does not, the DMB processing unit 120 returns back to step 201 so as to repeat steps 201 through 213.

As described above, the DMB receiving terminal 40 identifies a channel service area in which the DMB receiving terminal 40 is currently located based on an identified current location, and configures a channel information list by searching only a frequency band corresponding to the channel service area. Thereafter, when the channel service area is changed, the DMB receiving terminal 40 searches a prestored connection channel list, and identifies a predetermined channel established as a transition channel corresponding to a channel which the DMB receiving terminal 40 has received, from channels belonging to the changed channel service area. Then, the DMB receiving terminal 40 receives the identified channel and provides terrestrial DMB service, thereby reducing a channel search time period and smoothly providing the terrestrial DMB service.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A Digital Multimedia Broadcasting (DMB) terminal for providing a DMB service, wherein the DMB terminal performs a method comprising the steps of:

monitoring the occurrence of a channel search request;

identifying a current location of the DMB terminal;

searching a connection channel as a transition relation corresponding to a channel received in a previous service area when the DMB terminal moves from the previous service area to another service area;

searching a channel service area database, which includes channel service area information according to areas, for the another service area corresponding to the current location; and configuring a channel information list with channels belonging to the channel service area according to a result of the searching for the connection channel, and providing the DMB service to a user.

2. The DMB terminal of claim 1, further comprising, when a broadcast of a predetermined channel is currently being output after the DMB processing unit has provided the channel information list, detecting a channel established as a transition channel corresponding to the predetermined channel in a pre-stored connection channel list, from among the channels belonging to the another service area; and receiving and outputting a terrestrial DMB of the transition channel to the user.

3. The DMB terminal of claim 2, wherein the channel service area database includes a connection channel list, the connection channel list includes a transition relation established between channels belonging to different service areas, in which each channel belonging to one service area is established to have a transition relation with a channel belonging to each of the other service areas according to the designation of the user, and the transition relation is recorded in the connection channel list.

4. The DMB terminal of claim 1, wherein the channel service area database is constructed by partitioning an entire area to which terrestrial DMB service is provided into a predetermined lattice, relating longitude and latitude values of each lattice cell to a corresponding terrestrial DMB service area, and mapping each channel service area to a corresponding frequency band.

5. The DMB terminal of claim 1, wherein the channel search request occurs in response to an input of the user.

6. The DMB terminal of claim 1, wherein the channel search request occurs at preset intervals.

7. The DMB terminal of claim 1, wherein the channel search request occurs when the DMB receiving terminal receives a new base station ID from a mobile communication network.

8. The DMB terminal of claim 1, wherein the step of identifying the current location is performed by means of a pre-installed Global Positioning System (GPS) receiver.

9. The DMB terminal of claim 1, wherein the step of identifying the current location is performed by requesting the current location to a Location Based Service (LBS) server by means of a base station ID of a base station which the DMB receiving terminal currently accesses.

10. A terrestrial Digital Multimedia Broadcasting (DMB) service apparatus comprising:

a memory unit for storing a channel service area database which includes channel service area information according to areas; and a DMB processing unit for, when a channel search request has occurred, identifying a current location, searching a connection channel as a transition relation corresponding to a channel received in a previous service area when the DMB terminal moves from the previous service area to another service area, searching a pre-stored channel service area database for the another service area corresponding to the current location, configuring a channel information list with channels belonging to the channel service area according to a result of the searching for the connection channel, and providing the DMB service list to a user.

11. The apparatus as claimed in claim 10, wherein the memory unit stores a channel list which includes a transition relation established between channels belonging to different service areas; and when a broadcast of a predetermined channel is currently being output after the DMB processing unit has provided the channel information list, the DMB processing unit detects a channel established as a transition channel corresponding to the predetermined channel in a pre-stored connection channel list, from among the channels belonging to the another service area, and receives and outputs a terrestrial DMB of the transition channel to the user.

12. The apparatus as claimed in claim 11, wherein, the connection channel list is configured in such a manner that each channel belonging to one service area is established to have a transition relation with a channel belonging to each of the other service areas according to the designation of the user, and the transition relation is recorded in the connection channel list.

13. The apparatus as claimed in claim 10, wherein the channel service area database is constructed by partitioning an entire area to which terrestrial DMB service is provided into a predetermined lattice, relating longitude and latitude values of each lattice cell to a corresponding terrestrial DMB service area, and mapping each channel service area to a corresponding frequency band.

14. The apparatus as claimed in claim 10, wherein the DMB processing unit senses the channel search request occurring in response to an input of the user.

15. The apparatus as claimed in claim 10, wherein the DMB processing unit senses the channel search request occurring at preset intervals.

16. The apparatus as claimed in claim 10, wherein the DMB processing unit senses the channel search request occurring when receiving a new base station ID from a mobile communication network.

17. The apparatus as claimed in claim 10, wherein the DMB processing unit identifies the current location by means of a Global Positioning System (GPS) receiver.

18. The apparatus as claimed in claim 10, wherein the DMB processing unit identifies the current location by requesting the current location to a Location Based Service (LBS) server by means of a base station ID of a base station which the DMB receiving terminal currently accesses.

19. A terrestrial Digital Multimedia Broadcasting (DMB) service apparatus comprising:

a display; and a DMB processing unit for, when a channel search request has occurred, identifying a current location, identifying a channel service area corresponding to the current location by accessing a server which includes channel service area information according to areas, searching for a connection channel as a transition relation corresponding to a channel received in a previous service area in a server when the identified channel service area is different from the previous service area, searching for channels belonging to the identified channel service area in the server, configuring a channel information list with searched channels according to a result of the searching for the connection channel, and providing the DMB service list to a user.

20. The apparatus as claimed in claim 19, wherein, when a broadcast of a predetermined channel is currently being output after the DMB receiving terminal has provided the channel information list, the DMB processing unit detects a channel established as a transition channel corresponding to the predetermined channel in a pre-stored connection channel list, from among the channels belonging to the identified channel service area, and receives and outputs a terrestrial DMB of the transition channel to the user.

21. The apparatus as claimed in claim 20, wherein the connection channel list includes a transition relation established between channels belonging to different service areas, in which each channel belonging to one service area is established to have a transition relation with a channel belonging to each of the other service areas according to the designation of the user, and the transition relation is recorded in the connection channel list.

22. The apparatus as claimed in claim 19, wherein the channel service area database is constructed by partitioning an entire area to which terrestrial DMB service is provided into a predetermined lattice, relating longitude and latitude values of each lattice cell to a corresponding terrestrial DMB service area, and mapping each channel service area to a corresponding frequency band.

* * * * *